United States Patent [19]
Green et al.

[11] 3,940,987
[45] Mar. 2, 1976

[54] APPARATUS FOR MEASURING THE TEMPERATURE OF AN OPERATING SPARK PLUG

[75] Inventors: Sam J. Green, Temperance, Mich.; Frank J. Raeske, Curtice, Ohio

[73] Assignee: Champion Spark Plug Company, Toledo, Ohio

[22] Filed: June 24, 1974

[21] Appl. No.: 482,327

[52] U.S. Cl................ 73/346; 73/359; 123/169 R; 313/10; 315/129; 340/190; 340/207 R
[51] Int. Cl.$^2$.. G01K 7/02; F02P 17/00; G08C 9/06
[58] Field of Search........... 73/346, 359; 123/169 R, 123/169 TC; 313/10; 315/129; 340/190

[56] References Cited
UNITED STATES PATENTS

| | | | |
|---|---|---|---|
| 903,090 | 11/1908 | Hopkins............................ | 73/359 X |
| 3,461,384 | 12/1969 | Bayati............................... | 340/190 X |

OTHER PUBLICATIONS

Craver, R. J. et al., Spark Plug Design Factors and Their Effect on Engine Performance, SAE Paper 700081 for Meeting Jan. 1970, pp. 229, 231-232.

Moulton, C. H., Light Pulse System .... In Electronics, 38(10), pp. 71-75, May 17, 1965.

*Primary Examiner*—Richard C. Queisser
*Assistant Examiner*—Frederick Shoon
*Attorney, Agent, or Firm*—Oliver E. Todd, Jr.

[57] ABSTRACT

Apparatus for measuring the temperature of the insulator tip of a spark plug being operated in an internal combustion engine. A thermocouple is embedded in the surface of the insulator tip adjacent the spark gap for sensing temperature. The output of the thermocouple is connected through an electro-optical ignition voltage isolation circuit to circuitry which maintains a substantially constant temperature signal during the time interval that ignition voltage is applied to fire the spark plug. The temperature signal may drive a temperature indicating display or devices such as chart or tape recorders to produce records which may be used in analyzing either operation of the spark plug or combustion.

10 Claims, 3 Drawing Figures

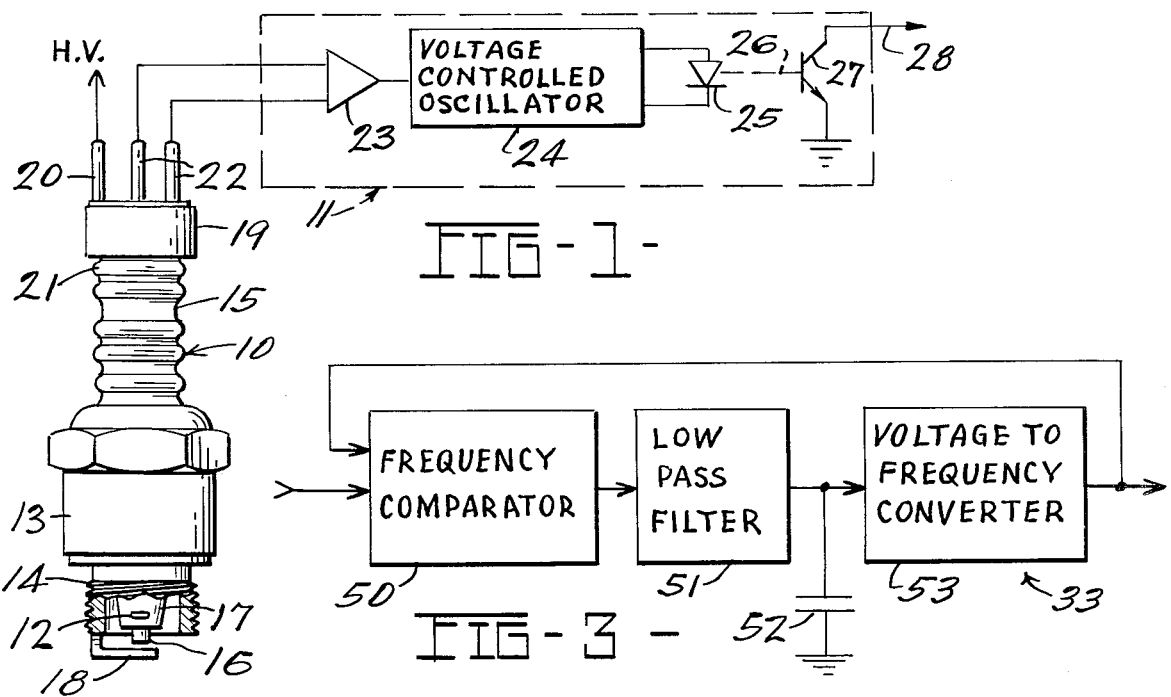
FIG-1-
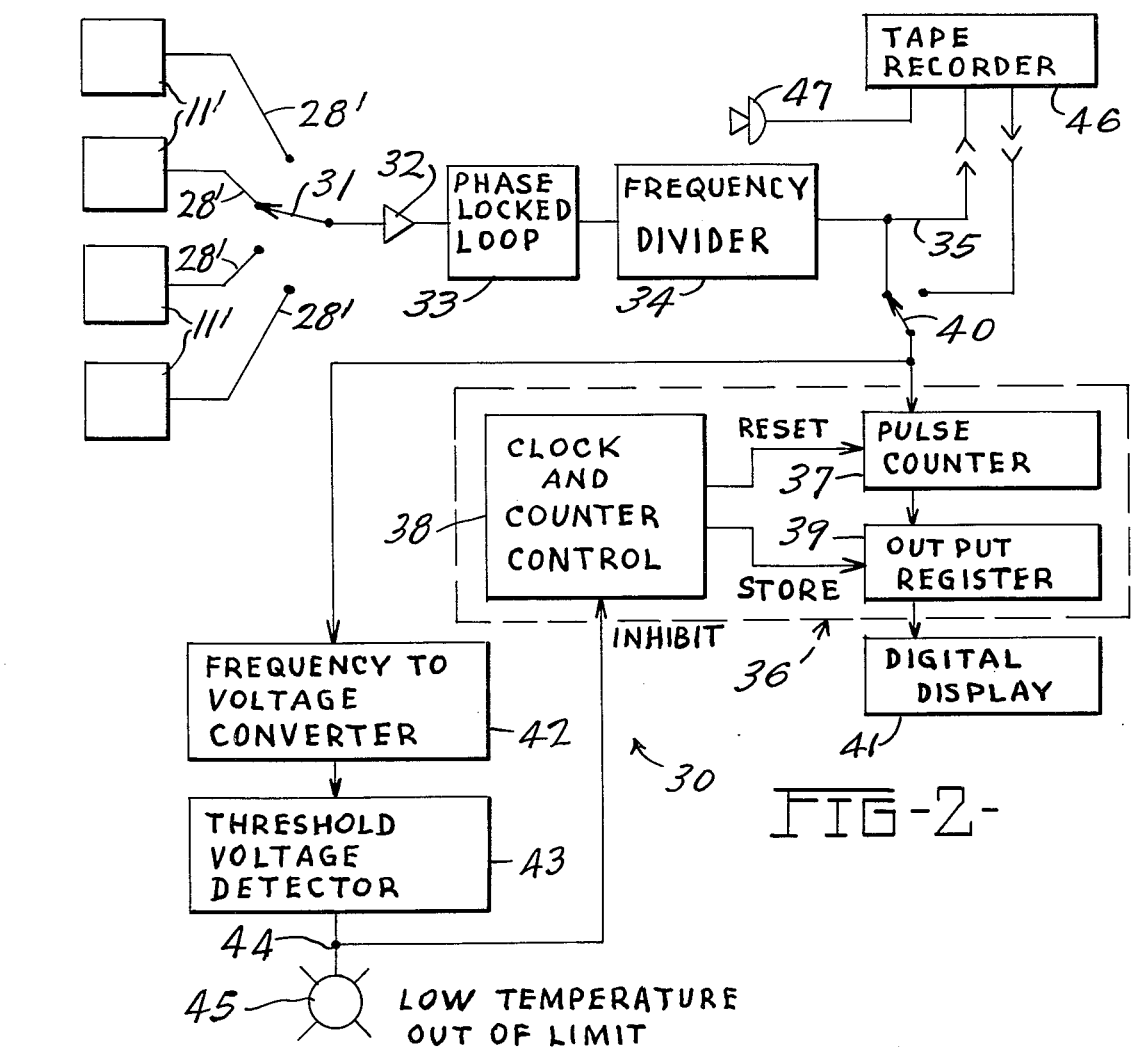
FIG-3-
FIG-2-

APPARATUS FOR MEASURING THE TEMPERATURE OF AN OPERATING SPARK PLUG

BACKGROUND OF THE INVENTION

This invention relates to temperature measuring and more particularly to improved apparatus for measuring the temperature of a spark plug while such spark plug is being operated in an internal combustion engine.

Designers of spark-ignited internal combustion engines and spark plug manfacturers often need to know the temperature of the insulator nose in a spark plug adjacent the spark gap while the spark plug is operating in an engine. The insulator nose temperature is of importance because it forms an indication of whether or not the heat range of the spark plug is properly matched to the engine. If the temperature of the insulator firing tip or nose is too cold, carbon deposits will accumulate and eventually foul the spark plug. If the insulator firing tip is too hot, the fuel charge will be ignited prior to normal spark ignition resulting in what is known as "preignition." The actual temperature of the spark plug insulator nose is controlled by various factors, a primary one being the length of the insulator firing tip from a heat conducting seat to the end of the insulator. The temperature will also vary as a function of the engine speed, with the temperature increasing as speed increases. Therefore, a spark plug must be matched to an engine such that at idle, or the lowest engine speed, the insulator firing tip does not operate in a cold fouling range and at the highest engine speed the insulator firing tip temperature does not cause preignition. A typical operating temperature range for an insulator firing tip falls between about 700° to 1750° F.

In the past, the operating temperature of a spark plug has been measured by embedding a thermocouple in the surface of the insulator firing tip adjacent the spark gap. Wires are then passed up a bore through the center of the insulator, along with the center electrode, and connected to terminals on the upper end of the insulator. The terminals are connected to a pyrometer which indicates the operating temperature of the spark plug.

Considerably difficulty has occurred in using thermocouple spark plugs in the past for measuring spark plug operating temperatures. The main source of the difficulty has been the high voltage ignition system connected to the center electrode of the spark plug. In a typical ignition system, a voltage on the order of 6,000 to 20,000 volts is applied to the center electrode of a spark plug for establishing a spark which ignites a fuel-air mixture. Since the thermocouple leads pass through the spark plug insulator bore along with the center electrode, the leads cannot be at ground potential, or arcing will occur. Therefore, it has been necessary to allow the thermocouple and the connected pyrometer to float above ground potential at the voltage level of the center electrode. Since the thermocouple and pyrometer were allowed to float at the ignition voltage level, other equipment such as tape or chart recorders could not be connected to the thermocouple output. This means that a driver or operator must be present for recording data such as engine speed and operating temperature visually observed on the pyrometer. However, manually recording data is not always convenient. For example, a motorcycle may reach speeds on the order of 100–130 miles per hour or more during races. Under such conditions, the driver cannot record temperature data relating to the operation of the spark plugs. However, such data may be important in evaluating the high speed operation of the spark plug. Therefore, it is desirable to have a means for automatically recording spark plug temperature while the spark plug is in operation.

Problems with prior art thermocouple spark plug circuitry for monitoring spark plug temperature have also occured with many modern engines which incorporate electronic fuel injection. One approach to minimizing air pollution from spark-ignited internal combustion engines has been to replace the conventional carburetor with a fuel injection system. In modern engines, such systems are commonly controlled by means of electronic circuitry. During ignition, considerable high-frequency radiation occurs from the pyrometer and wires connected to a thermocouple spark plug. This radiation may disturb normal operation of the electronic control circuitry for the fuel injection. Under such conditions, the engine will not run properly if it runs at all. The wires and pyrometer connected to the thermocouple spark plug may also adversely effect operation of the engine ignition system due to capacitive loading.

SUMMARY OF THE INVENTION

In accordance with the present invention, improved apparatus is provided for measuring the temperature of a spark plug being operated in an internal combustion engine. The apparatus includes a thermocouple embedded in the surface of the spark plug insulator and an ignition voltage isolation circuit which permits the use of equipment such as tape or chart recorders without floating such equipment above electrical ground. The ignition voltage isolation circuit can be located adjacent the thermocouple spark plug to minimize electrical radiation. The low voltage DC output from the thermocouple is amplified in the isolation circuit and used to control a voltage controlled oscillator. The oscillator in turn excites a light source to emit light at a frequency dependent upon the temperature of the spark plug. Only this portion of the apparatus floats above electrical ground at the ignition voltage level. The pulsating light is then picked up by a photoelectric detector and used for driving a meter. The signal may also be recorded and used at a later date for driving a meter or other devices. Prior to driving the meter, the signal from the photoelectric detector is preferably passed through a phase locked loop which maintains a constant output frequency while the signal from the thermocouple is temporarily blanked while high voltage ignition pulses are applied to the spark plug center electrode.

Several advantages are provided by isolating the high voltages to circuitry located adjacent the spark plug. Voltage isolation permits the use of recorders which facilitate making temperature readings in, for example, a motorcycle or other equipment driven at high speeds. Secondly, high-frequency radiation from the high voltage circuitry is minimized to the extent that a temperature reading may be made in an engine equipped with electronically controlled fuel injection without disturbing the operation of the fuel injection circuitry. Also, undesirable capacitive loading of the ignition system is minimized. Still another advantage is that several thermocouple spark plugs may be simultaneously operated in an engine with each spark plug connected to a separate voltage isolation circuit. A low voltage switch may then be provided for selectively switching a meter or recorder or other equipment to the different spark plugs.

Accordingly, it is the preferred object of the invention to provide improved apparatus for measuring the temperature of a spark plug insulator firing tip adjacent a spark gap while such spark plug is in operation in an internal combustion engine.

A further object of the invention is to provide improved circuitry for use with a thermocouple spark plug which isolates high voltage ignition pulses.

Still another object of the invention is to provide temperature indicating circuitry for use with a thermocouple spark plug which provides a continuous output while the thermocouple voltage is temporarily blanked by the ignition voltage.

Other objects and advantages of the invention will become apparent from the following detailed description, with reference being made to the accompanying drawings.

BRIEF DESCRIPTION OF THE DRAWINGS

FIG. 1 is a schematic block diagram of a spark plug mounting a low voltage thermocouple which is connected to an ignition voltage isolation circuit;

FIG. 2 is a schematic block diagram of a meter circuit for selectively recording or indicating the temperature of a spark plug having a thermocouple mounted thereon; and FIG. 3 is a block diagram of a phase locked loop for maintaining a temperature signal while the thermocouple output is temporarily blanked by a high voltage ignition pulse.

DESCRIPTION OF THE PREFERRED EMBODIMENT

Referring now to the drawings and particularly to FIG. 1, a block diagram is shown of a thermocouple spark plug 10 connected to an ignition voltage isolation circuit 11. The spark plug 10 may be of a conventional design, except that a thermocouple 12 is mounted thereon. The spark plug 10 includes a metal shell 13 having a lower end 14 threaded for engaging the cylindrical head of an internal combustion engine. A ceramic insulator 15 is mounted within the shell 13. A center electrode 16 extends through an internal bore (not shown) through the insulator 15 and projects from an insulator nose or firing tip 17 to define a spark gap with a ground electrode 18 mounted on the lower shell end 14. A connector 19 having a high voltage terminal 20 is mounted on an upper end 21 of the insulator 15. The high voltage terminal 20, which is electrically connected to the center electrode 16 provides convenient means for connection to an ignition system (not shown) for the engine in which the spark plug 10 is operated.

The thermocouple 12 is embedded in the surface of the insulator firing tip 17. The thermocouple 12 is of conventional design, consisting of a junction between two dissimilar metals or metal alloys. The dissimilar metals may, for example, consist of platinum for one side of the junction and an alloy of platinum and 10% rhodium for the other function. The two sides of the thermocouple junction are connected by means of insulated wires (not shown) to a pair of terminals 22 on the connector 19. The wires extend through the center electrode bore in the insulator 15 along with the center electrode 16. A thermocouple 12 constructed from the above exemplary metals will generate a DC voltage on the order of approximately 0.6 millivolts when the junction is heated to 200° F. and approximately 9.5 millivolts when the junction is heated to 1800° F. This voltage, which appears across the pair of terminals 22, is applied to the ignition voltage isolation circuit 11. Within the ignition voltage isolation circuit 11, an operational amplifier 23 amplifies the thermocouple voltage to a level sufficient for driving a voltage controlled oscillator 24. The oscillator 24 will have an output frequency dependent upon the input voltage from the amplifier 23 and, hence, dependent upon the temperature to which the thermocouple 12 is heated.

To facilitate indicating the temperature sensed by the thermocouple 12, the voltage controlled oscillator 24 is preferably calibrated such that the output frequency is a direct indication of the sensed temperature. For example, if the temperature sensed by the thermocouple 12 ranges between 300° and 2200° F. the oscillator may be designed to have an output frequency ranging from 300 to 2,200 Hz., or from 3,000 to 22,000 Hz. By using the higher of the two frequency ranges, the accuracy of the system is increased. It will therefore be assumed in the discussion below that the oscillator 24 will have an output ranging from 3,000 to 22,000 Hz. corresponding to a temperature variation of from 300° to 2,200° F., respectively. The output from the voltage controlled oscillator 24 is used to excite a light source, such as a light emitting diode (LED) 25 for producing a pulsating light. However, other light sources capable of following the output frequency of the oscillator 24 may also be used.

Light emitted by the LED 25 is transmitted over an optical path 26 to a photoelectric detector such as a phototransistor 27. The phototransistor 27 generates an output 28 having the same frequency as the pulsating light output from the LED 25. High voltage isolation is provided by means of the light path 26. The amplifier 23, the oscillator 24 and the LED 25 are permitted to float above electrical ground to prevent arcing from the center electrode 16 in the spark plug 10 to the thermocouple leads passing through the center electrode bore in the insulator 15. A suitable light guide is used in the light path 26 to maintain an efficient coupling between the LED 25 and the phototransistor 27. The light guide may, for example, consist of either a single fiber optic light pipe or a bundle of fiber optic light pipes.

The ignition voltage isolation circuit 11 is preferably mounted close to the spark plug 10. By minimizing the length of the connections between the thermocouple terminals 22 on the connector 19 and the ignition voltage isolation circuit 11, capacitive loading on the engine ignition system is minimized and electrical radiation resulting from high voltage ignition pulses is also minimized. As a consequence, a thermocouple spark plug 10 may be used in a vehicle having an electronically controlled fuel injection system without affecting the operation of the engine. Another benefit of using the ignition voltage isolation circuit 11 is that a multicylinder engine may be provided with several thermocouple spark plugs 10, each connected to a separate ignition voltage isolation circuit 11. The outputs 28 from the different ignition voltage isolation circuits 11 may then be selectively connected to a meter while the engine is operating.

Turning now to FIG. 2, a block diagram is shown of apparatus 30 for selectively monitoring the temperature of a plurality of spark plugs operating within an internal combustion engine. A switch 31 selectively connects the apparatus 30 to one of one or more ignition voltage isolation circuits 11' which are in turn connected to thermocouple spark plugs in an internal combustion engine. The output 28' from a connected one of the ignition voltage isolation circuits 11' is applied through an amplifier 32 to a phase locked loop 33. The phase locked loop 33 generates an electrically clean output pulse train having the same frequency as the amplified pulse train from the connected isolation circuit 11'. Furthermore, the phase locked loop 33 fills gaps in the pulse train which occur while ignition voltage pulses are applied to the center electrode of the connected spark plug. As previously indicated, the frequency of the pulse train from the ignition voltage isolation circuit 11' and hence the output frequency from the phase locked loop 33 has been calibrated to 10 times the temperature sensed by the thermocouple in the connected spark plug. Thus, if the thermocouple senses temperatures within a range of from 300° to 2,200°F., the output frequency from the phase locked loop 33 will range from 3,000 to 22,000 Hz. The output from the phase locked loop 33 is applied through a frequency divider 34 which divides the frequency by a factor of 10 such that an output signal applied to a terminal 35 has a frequency ranging from 300 to 2,200 Hz. Since the frequency of the signal on the terminal 35 is identical to the temperature of the connected spark plug, a conventional digital frequency counter 36 may be used for determining temperature. The digital frequency counter 36 may generally comprise a pulse counter 37, a clock and counter control 38 and an output register 39. The output terminal 35 from the frequency divider 34 is connected through a switch 40 to a clock pulse input to the counter 37. The clock and counter control 38 periodically clears and starts the pulse counter 37 to count pulses on the terminal 35. After pulses are counted for a measured time interval, one second in this instance, the contents of the counter 37 are stored in the output register 39. This number corresponds to the frequency of the signal on the terminal 35 and, hence, also corresponds to the temperature of the connected spark plug. The number stored in the register 39 is then applied to a digital display 41 which is of conventional design. The digital display 41 may, for example, consist of four seven-segment indicators capable of selectively indicating temperatures ranging from zero to 9999. However, as a practical matter, the digital display 41 is used only for indicating temperatures ranging from 300° to 2,200°F.

Below approximately 300°F., the output from the thermocouple mounted in a connected spark plug will become non-linear. Furthermore, a spark plug actually operating in an internal combustion engine will always have an insulator firing tip temperature above 300°F. due to the high temperature of combustion. Therefore, circuitry is provided to inhibit the digital display 41 from displaying an erroneous temperature when the thermocouple is below 300°F. In addition to supplying a pulse signal from the terminal 35 to the pulse counter 37, the switch 40 also applies the same signal to a frequency-to-voltage converter 42. The frequency-to-voltage converter 42 will have a DC output level which is proportional to the frequency of the signal on the terminal 35 and hence proportional to the temperature sensed by a connected thermocouple. This DC voltage is applied to a threshold voltage detector 43. The threshold voltage detector 43 is calibrated such that it will sense a voltage level from the converter 42 corresponding to a temperature of 300°F. When the threshold voltage detector 43 detects a voltage level corresponding to a temperature below 300°F., a signal is applied on a terminal 44 to cause a low temperature out-of-limit indicator light 45 to become illuminated and also to inhibit the digital frequency counter 36, blanking the display 41. The low temperature out-of-limit indicator light 45 is extinguished and the digital frequency counter 36 becomes activated when the threshold voltage detector 43 senses a voltage corresponding to a temperature above 300°F.

In some instances, it may be desirable to record spark plug temperature data. Therefore, provisions may be made for connecting a tape recorder 46 directly to the output terminal 35 from the frequency divider 34. It will be apparent that since the signal on the terminal 35 has been designed to range from 300 to 2,200 Hz., it falls within the audio frequency range. Therefore, the signal may be recorded directly on magnetic tape for future use. In this case, only the ignition voltage isolation circuit 11, the amplifier 32, the phase locked loop 33 and the frequency divider 34 may be mounted on the engine or vehicle under test in addition to the tape recorder 46. At a later time, the recorded tape may be played and analyzed. At this time, the output of the tape recorder may be connected through the switch 40 to the digital frequency counter 36 and the digital display 41 for analysis. A microphone 47 may also be connected to the tape recorder 46 for supplying additional data which is recorded on a second channel on the tape. If, for example, the operation of a spark plug is being tested in a racing motorcycle, the microphone 47 may be mounted in the driver's helmet. The driver can then supply additional data which is recorded on magnetic tape by the recorder 46. For example, the driver may indicate his speed at periodic intervals. He may also indicate changes in load conditions on the motorcycle such as the occurrence of hills. When the recorded tape is subsequently played back, this information may be used for analyzing the performance of the spark plugs or analyzing combustion in the engine. Of course, the terminal 35 may be connected to other equipment such as a chart recorder or meter through a frequency-to-voltage converter (not shown) similar to the converter 42. Or, the terminal 35 may be connected to a data collection system for automatic reporting and plotting of road load or speed versus temperature curves.

Turning now to FIG. 3, a block diagram is shown for the phase locked loop 33. A frequency comparator 50 compares the frequency of the amplified signal from the ignition voltage isolation circuit 11 with the frequency of the output from the phase locked loop 33. The output of the frequency comparator 50 is applied through a low pass filter 51 to charge a capacitor 52. A constant charge will be maintained on the capacitor 52 if the incoming frequency to the comparator 50 corresponds with the output frequency from the phase locked loop 33 and the charge on the capacitor 52 will be increased or decreased at a rate and direction controlled by the degree and direction of deviation between the frequencies of the compared signals. The voltage across the capacitor 52 is applied to control the output frequency of a voltage-to-frequency converter 53. The converter 53 generates an output signal which is applied both to the frequency comparator 50 and to the frequency divider 34 in FIG. 2. The low pass filter 51 limits the charging or discharging rate of the capacitor 52. Thus, when the amplified input signal from a connected ignition voltage isolation circuit 11 is temporarily blanked during the application of a high voltage ignition pulse to a spark plug, the charge on the capacitor 52 will remain substantially constant to maintain a substantially constant output frequency.

It will be appreciated that various modifications and changes may be made in the above-described apparatus for measuring the temperature of a spark plug insulator nose while the spark plug is operated in an internal combustion engine. For example, the operating frequencies and the type of meter for indicating the temperature sensed by a thermocouple may be readily modified as will be apparent to those skilled in the art. In addition, the light emitting diode 25 and the phototransistor 27 may be formed from other equivalent circuit elements. Various other modifications and changes may also be made without departing from the spirit and the scope of the following claims.

What we claim is:

1. Apparatus for measuring the temperature of a spark plug while such spark plug is operated in a running internal combustion engine which includes an ignition system for periodically applying a high voltage ignition pulse to fire the spark plug, said apparatus comprising, in combination, a thermocouple mounted for measuring the temperature of the spark plug, said thermocouple generating a DC voltage which varies as a function of the spark plug temperature, voltage controlled oscillator means for generating a first signal having a frequency controlled in response to the DC thermocouple voltage, means responsive to such first signal for emitting pulsating light at the controlled frequency, photoelectric detecting means responsive to the emitted light for generating a second signal having the controlled frequency, said detecting means being electrically insulated from said oscillator means and said light emitting means, and means responsive to such second signal for indicating the temperature measured by said thermocouple.

2. Temperature measuring apparatus, as set forth in claim 1, wherein the first signal is temporarily blanked by a higher magnitude capacitively coupled signal from the ignition system each time a high voltage ignition pulse is applied to fire the spark plug, and including means for maintaining the second signal uninterrupted while the first signal is temporarily blanked out by such capacitively coupled signal.

3. Temperature measuring apparatus, as set forth in claim 2, wherein said second signal maintaining means comprises a phase locked loop.

4. Temperature measuring apparatus, as set forth in claim 1, wherein said light emitting means comprises a light emitting diode.

5. Temperature measuring apparatus, as set forth in claim 1, wherein said temperature indicating means includes means for counting pulses in the second signal for a predetermined time interval, such pulse count corresponding to a digital representation of the measured temperature, means for storing such pulse count, and a digital indicator connected to said storage means, said indicator indicating the measured spark plug temperature.

6. Temperature measuring apparatus, as set forth in claim 1, wherein said indicating means comprises a digital frequency counter and a digital indicator connected to said frequency counter for indicating the frequency of said second signal, said indicated frequency corresponding to the measured spark plug temperature.

7. Temperature measuring apparatus, as set forth in claim 6, wherein the first signal is temporarily blanked by a higher magnitude capacitively coupled signal from the ignition system each time a high voltage ignition pulse is applied to fire the spark plug, said apparatus further including means for maintaining the second signal uninterrupted while the first signal is temporarily blanked out by such capacitively coupled signal.

8. Apparatus for measuring the temperature of a spark plug while such spark plug is operated in a running internal combustion engine which includes an ignition system for periodically applying a high voltage ignition pulse to fire the spark plug, said apparatus comprising, in combination, a thermocouple mounted for measuring the temperature of the spark plug, said thermocouple generating a DC voltage which varies as a function of the spark plug temperature, such DC voltage being temporarily blanked by a higher magnitude capacitively coupled signal from the ignition system each time a high voltage ignition pulse is applied to fire the spark plug, means responsive to such thermocoupled voltage for generating a temperature signal which is continuous while the DC thermocouple voltage is temporarily blanked by such capacitively coupled signal, and means for utilizing such continuous temperature signal.

9. Temperature measuring apparatus, as set forth in claim 8, wherein said continuous temperature signal generating means includes a phase locked loop.

10. Temperature measuring apparatus, as set forth in claim 8, and further including high voltage isolation means connected between said thermocouple and said continuous temperature signal generating means whereby said thermocouple is electrically isolated from ground.

* * * * *